(12) United States Patent
Alveby

(10) Patent No.: US 9,992,967 B2
(45) Date of Patent: Jun. 12, 2018

(54) SECURE COLLAPSE TEATCUP LINER

(71) Applicant: DELAVAL HOLDING AB, Tumba (SE)

(72) Inventor: Nils Alveby, Bandhagen (SE)

(73) Assignee: DELAVAL HOLDING AB, Tumba (SE)

( * ) Notice: Subject to any disclaimer, the term of this patent is extended or adjusted under 35 U.S.C. 154(b) by 121 days.

(21) Appl. No.: 14/967,407

(22) Filed: Dec. 14, 2015

(65) Prior Publication Data

US 2017/0164575 A1    Jun. 15, 2017

(51) Int. Cl.
    *A01J 5/16*    (2006.01)
    *A01J 5/06*    (2006.01)
    *A01J 5/08*    (2006.01)

(52) U.S. Cl.
    CPC ..... *A01J 5/16* (2013.01); *A01J 5/06* (2013.01); *A01J 5/08* (2013.01)

(58) Field of Classification Search
    CPC .................. A01J 5/06; A01J 5/08; A01J 5/16
    USPC .......... 119/14.31, 14.32, 14.47, 14.49, 14.52
    See application file for complete search history.

(56) References Cited

U.S. PATENT DOCUMENTS

| 2,565,721 | A |   | 8/1951  | Conde  |          |
|-----------|---|---|---------|--------|----------|
| 2,687,112 | A |   | 8/1954  | Shurts |          |
| 3,289,634 | A | * | 12/1966 | Simons | A01J 5/08 |
|           |   |   |         |        | 119/14.52 |
| 4,572,106 | A | * | 2/1986  | Mills  | A01J 5/08 |
|           |   |   |         |        | 119/14.47 |
| 5,482,004 | A | * | 1/1996  | Chowdhury | A01J 5/08 |
|           |   |   |         |        | 119/14.52 |
| 5,493,995 | A | * | 2/1996  | Chowdhury | A01J 5/044 |
|           |   |   |         |        | 119/14.47 |
| 6,164,243 | A |   | 12/2000 | Larson |          |

(Continued)

FOREIGN PATENT DOCUMENTS

EP    0 958 738 A1    11/1999
EP    1902613    3/2008

(Continued)

OTHER PUBLICATIONS

Swedish Final Notice dated Jun. 22, 2016; Application No. 1551637-0.

(Continued)

*Primary Examiner* — Monica L Williams
*Assistant Examiner* — Brady W Frazier
(74) *Attorney, Agent, or Firm* — Young & Thompson

(57) ABSTRACT

A teatcup liner includes a head defining a mouthpiece, a barrel with an upper barrel joined to a lower barrel, an outlet portion that extends downward from the lower barrel co-operates with the shell of the teat cup. In a relaxed state, the barrel has a polygonal cross-sectional shape, with the lower barrel having a flexibility for closing during the liner collapse phase of the milking operation greater than a flexibility of the upper barrel such that corner portions of the lower barrel are weaker than the corner portions of the upper barrel thereby assuring the lower barrel collapses first to create an upward wave movement of the lower barrel towards the upper barrel that securely collapses the upper barrel onto the teat to provide an enhanced teat massage and relieve congestion in the teat tissue.

20 Claims, 8 Drawing Sheets

(56) References Cited

U.S. PATENT DOCUMENTS

| | | | | |
|---|---|---|---|---|
| 6,427,624 B1* | 8/2002 | Briggs | ............... | A01J 5/08 |
| | | | | 119/14.01 |
| 6,776,120 B1* | 8/2004 | Chowdhury | ............ | A01J 5/08 |
| | | | | 119/14.46 |
| 8,113,145 B2 | 2/2012 | Sellner | | |
| 8,820,263 B2 | 9/2014 | Alveby | | |
| 2006/0005772 A1* | 1/2006 | Shin | ................ | A01J 5/08 |
| | | | | 119/14.52 |
| 2008/0072826 A1 | 3/2008 | Happel | | |
| 2011/0126768 A1* | 6/2011 | Grace | ............... | A01J 5/08 |
| | | | | 119/14.47 |
| 2013/0291800 A1* | 11/2013 | Alveby | ............... | A01J 5/08 |
| | | | | 119/14.49 |
| 2014/0123903 A1* | 5/2014 | Priest | ............... | A01J 5/08 |
| | | | | 119/14.47 |
| 2015/0090183 A1 | 4/2015 | Hedlund et al. | | |
| 2015/0114298 A1* | 4/2015 | Alveby | ............... | A01J 5/16 |
| | | | | 119/14.02 |

FOREIGN PATENT DOCUMENTS

| | | |
|---|---|---|
| FR | 953 779 A | 12/1949 |
| WO | 2009/042022 A1 | 4/2009 |

OTHER PUBLICATIONS

International-Type Search Report dated Jun. 22, 2016; Application No. 1551637-0.

\* cited by examiner

SECURE COLLAPSE TEATCUP LINER

BACKGROUND OF THE INVENTION

The present invention provides a teatcup liner having a barrel that provides an enhanced teat massage and relieves congestion in the teat tissue during a milking operation. The teatcup liner is configured to be mounted in a shell of a teatcup to be applied to a teat of an animal for the milking operation.

The teatcup liner provides that during a liner collapse phase of the milking operation, as the atmosphere, or a sub-pressure less than the milking vacuum, is allowed into the pulsation chamber, a lower barrel part collapses creating an upward wave movement that securely collapses an upper barrel part of the teatcup liner against the teat and thereby avoids any chance of the barrel pressing lymphs downward as the barrel collapses.

DISCUSSION OF THE PRIOR ART

FIG. 1 illustrates a cycle of the milking operation. During the milking operation, a vacuum level is applied to the inner space of the barrel which holds the teat and causes withdrawal of the milk. Additionally, vacuum and atmospheric pressure (or the sub-pressure) are cyclically applied to the pulsation chamber located between exterior surfaces of the barrel and the inner side of the shell so that the barrel cyclically collapses against the teat located inside the inner space of the barrel.

Phases A-B correspond to the milking phase where the teatcup liner is opening (phase A) or open (phase B). Phases C-D correspond to the relaxed phase where the liner is closing or closed. Phase C corresponds to the liner collapse phase where atmosphere, or a sub-pressure less than the milking vacuum, is allowed into the pulsation chamber such that the differential pressure across the barrel of the teatcup liner increases and causes the barrel to collapse onto the teat to provide a teat massage.

The benefits of teat massage are well known and different liner structures, having different cross-sectional shapes, have been provided with an eye toward positive teat massage.

U.S. Pat. No. 2,687,112 discloses a teatcup liner comprising non-collapsible collar merged with a yieldable inflation sleeve to provide an inactive entrance zone which prevents undue and harmful massaging.

U.S. Pat. No. 6,164,243 discloses a teatcup liner comprising a head end portion, a barrel, and an outlet tube. The barrel has a triangular shape with three corner portions and three side portions extending along the length of the barrel. Each of the side portions is curved or bulged outwardly in a relaxed state.

FR-953,779 discloses another teatcup comprising a shell and a teatcup liner, both having a triangular cross-section with outwardly curved or bulged side portions in a relaxed state.

Teatcup liners having a barrel with a triangular cross-sectional shape are advantageous in the sense that they are considered to result in a gentle teat treatment during the milking operation. A disadvantage of such triangular or polygonal teatcup liners is, however, that they do not sufficiently shut off the vacuum to the mouthpiece of the liner, resulting in a slower milking.

WO 2009/042022 discloses a teatcup liner having a barrel with a square cross-section.

EP-958 738 discloses a teatcup liner having a barrel with a wave-shape cross-section.

U.S. Pat. No. 8,113,145 discloses a teatcup liner having a barrel with a round cross-section in its upper part portion and a square cross-section in its lower portion to obtain a uniform seal with minimal irritation in the upper portion of a teat and with reduced pressure applied to the lower portion of a teat. In the barrel square portion, one corner-to-corner dimension is greater than the other corner-to-corner dimension to provide different corner radiuses so that the square barrel portion collapses in a roughly diamond shape.

U.S. Pat. No. 6,776,120 discloses teatcup liners of various thickness and with a barrel where at least one of the wall thickness and rib thickness varies as the barrel and the ribs extend axially.

U.S. Pat. No. 8,820,263 discloses a liner with a barrel having a polygonal cross-sectional shape transversely to the longitudinal axis along the barrel which provides an efficient milking and secures a gentle treatment of the teat during the milking operation.

SUMMARY OF THE INVENTION

The object of the present invention is to overcome problems of prior art teatcup liners and to provide a teatcup liner providing an efficient milking, and securing a gentle treatment of the teat during the milking operation, and in particular providing enhanced teat massage and relieving congestion in the teat tissue by assuring a secure collapse of the upper barrel part during the liner collapse phase of the milking operation.

In the present invention, during phase C of the milking operation, corresponding to the liner collapse phase where the barrel is initially in a non-collapsed condition, atmosphere, or a sub-pressure less than the milking vacuum, is allowed into the pulsation chamber such that the differential pressure across the barrel of the teatcup liner increases to cause a lower barrel part to collapse first such that the collapse of the lower barrel creates an upward wave movement of the lower barrel towards the upper barrel that securely collapses the upper barrel onto the teat to provide an enhanced teat massage and relieve congestion in the teat tissue. Additionally, the upward wave movement avoids any chance of the barrel pressing lymphs downward as the barrel collapses.

In each embodiment of the invention, this object is achieved by the teatcup liner including a polygonal cross-sectional shape barrel comprised of an upper barrel and a lower barrel, the length of the upper barrel being such that the upper barrel contains all of the teat during the milking operation and, during the milking operation, the teat does not extend into the lower barrel; and where the lower barrel has a flexibility for closing during the liner collapse phase of the milking operation greater than a flexibility of the upper barrel such that corner portions of the lower barrel are weaker than the corner portions of the upper barrel thereby assuring the lower barrel collapses to create an upward wave movement of the lower barrel towards the upper barrel that securely collapses the upper barrel onto the teat to provide an enhanced teat massage and relieve congestion in the teat tissue. Advantageously, during each of the phases A-D, the teat fills up the inner space at least in a top region of the upper barrel.

The corner portions of the lower barrel may, for example, be made weaker by providing the corner portions of the lower barrel with a reduced thickness relative to the corner portions of the upper barrel, a smaller radius relative to the corner portions of the upper barrel, or by providing the corner portions of the lower barrel with hinge elements, e.g., notches.

Additionally, limiting the length of the lower barrel relative to the length of the whole barrel contributes to ensuring the upper barrel contains all of the teat during the milking operation and that the teat does not extend into the lower barrel, as well as ensuring that during the liner collapse phase, the lower barrel collapses to create an upward wave movement towards the upper barrel that securely collapses the upper barrel onto the teat.

The inventive teatcup liner may be either a single-piece liner or a modular liner where the head, the barrel, and the outlet portion are each modules that connect to each other, either directly or indirectly, e.g., via a sensor element or other connector.

BRIEF DESCRIPTION OF THE DRAWINGS

The present invention will now be explained more closely by description of various embodiments and with reference to the drawings attached hereto.

Figure 1:
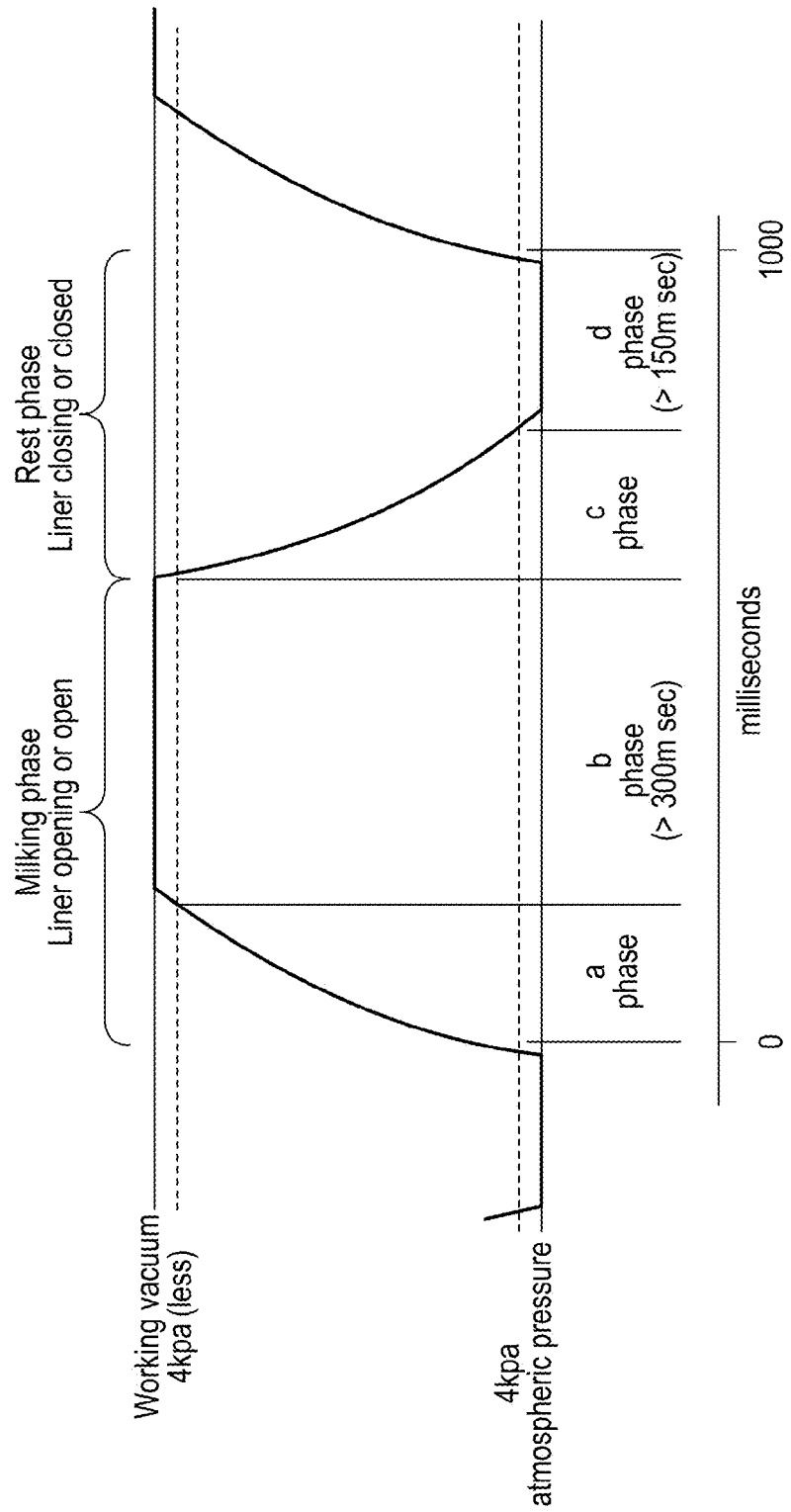
FIG. 1 illustrates a cycle of the milking operation.

REFERENCE NUMERALS 1 teatcup liner
2 barrel
3 upper barrel
4 lower barrel
5 top part of barrel
6 bottom part of upper barrel
7 top part of lower barrel
8 inner space of barrel
9 interior surface within upper barrel
10 head
11 mouthpiece
12 upper collar region
13 head transition portion
14 bottom of head transition portion
15 outlet portion
16 bottom part of lower barrel
17 outlet transition portion
18 element co-operating with shell of teat cup
19 corner portions
20 side walls
21 exterior surface of corner portion
22 exterior surface of side wall
23 inner surface of corner portion
24 inner surface of side wall
25 shell
26 pulsation space
27 shell vacuum line connection
28 inner surface notch
29 exterior surface notch
Tc thickness of center part of corner portions 19
Ts thickness of a center part of side walls 20
Lh head length along the longitudinal axis (x)

DETAILED DESCRIPTION OF VARIOUS EMBODIMENTS OF THE INVENTION

Figure 2:
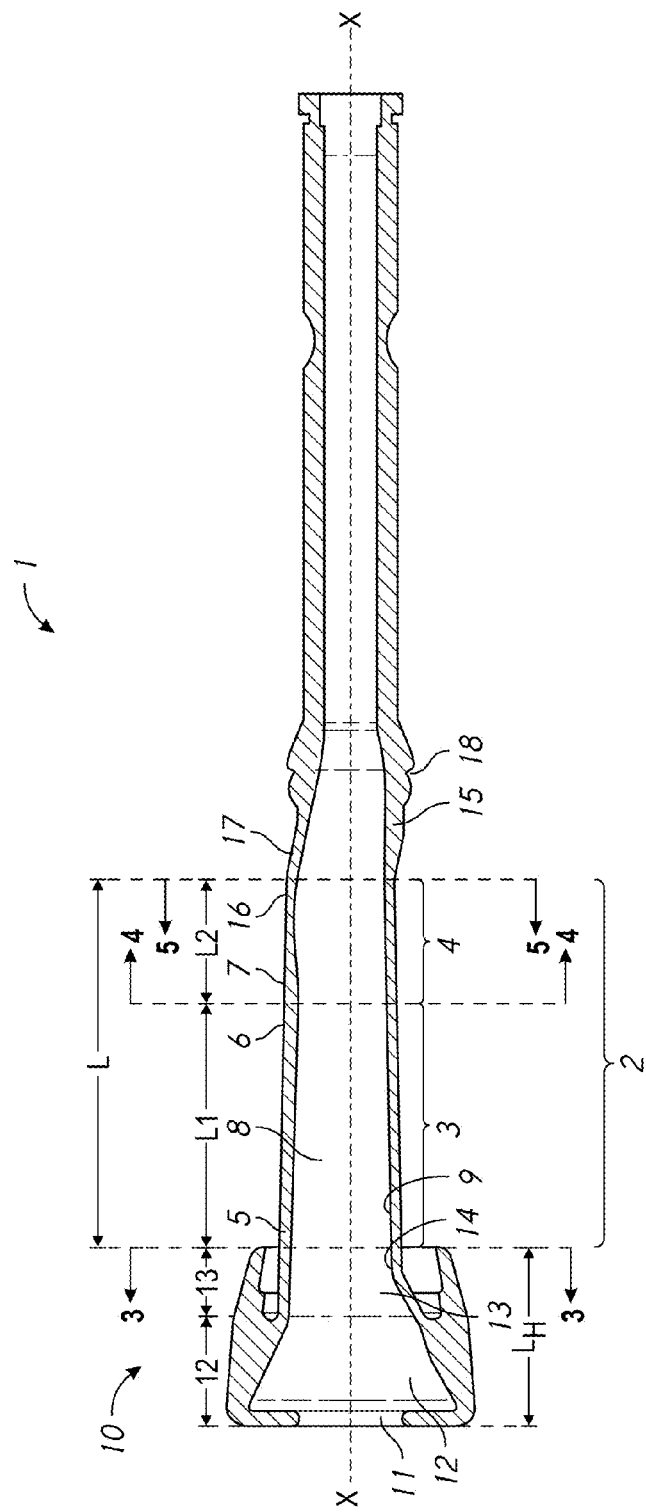
FIG. 2 discloses a longitudinal cross-sectional side view of an example of a first-type embodiment of a teatcup liner according to the invention.

FIG. 2 discloses a longitudinal cross-sectional side view of a first type embodiment of a teatcup liner 1 according to the invention. As shown, the liner 1 has a longitudinal shape extending along a longitudinal axis (x).

In all embodiments of the invention, the teatcup liner 1 includes a polygonal cross-sectional shaped barrel 2 comprised of an upper barrel 3 and a lower barrel 4.

Figure 3:
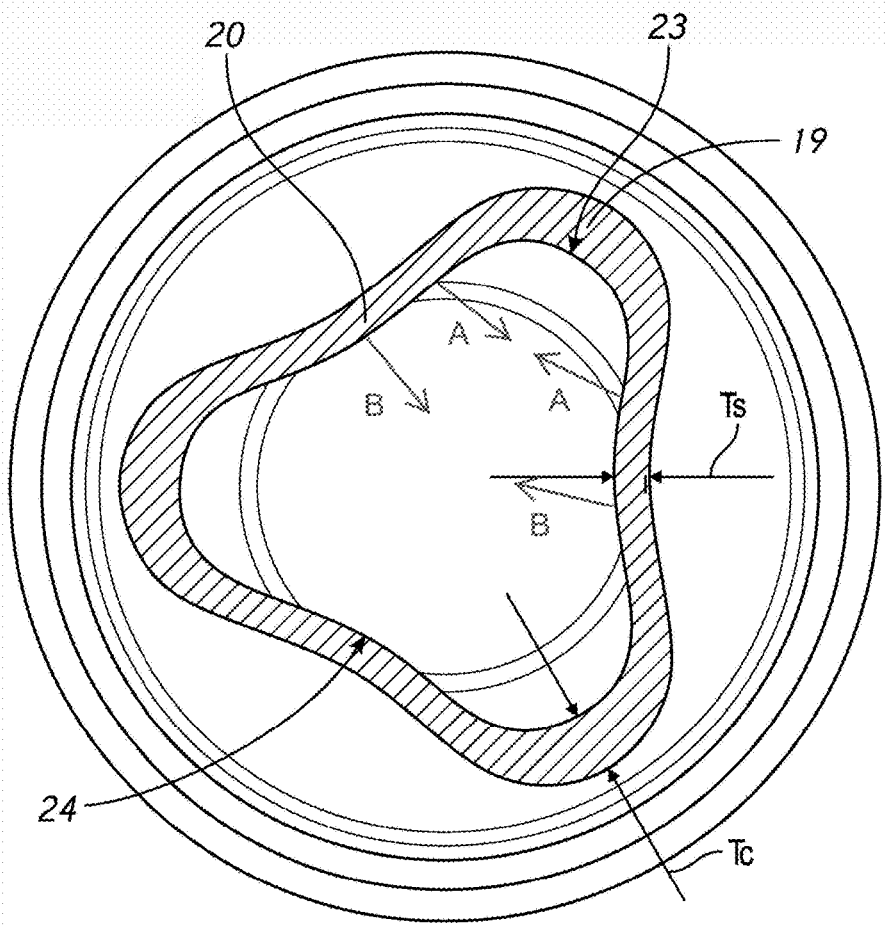
FIGS. 3-5 illustrate polygonal cross-sectional sections of the barrel along section lines 3-3, 4-4, and 5-5 of FIG. 1.
Figure 5:
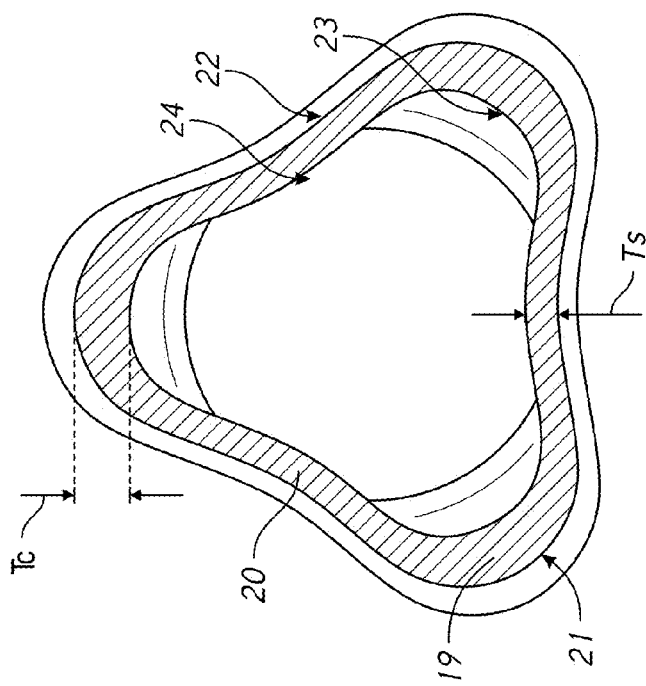
Figure 4:
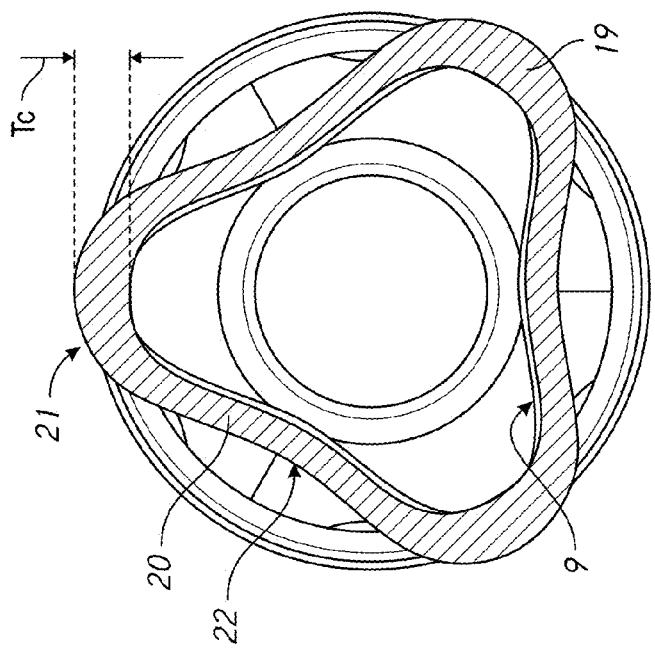

FIG. 3 illustrates the polygonal cross-sectional section at a top part 5 of the upper barrel 3 along section line 3-3. FIG. 4 illustrates the polygonal cross-sectional section along section line 4-4, where a bottom part 6 of the upper barrel 3 connects with a top part 7 of the lower barrel 4. FIG. 5 illustrates the polygonal cross-sectional section along section line 5-5.

The barrel 2 defines an inner space 8 with an interior surface 9 within the upper barrel 3 for receiving the teat.

The upper barrel 3 has a first length (L1) extending from section line 3-3 to section line 4-4. The lower barrel 4 has a second length (L2) extending from section line 4-4 to section line 5-5. The barrel 2 has an overall length (L) extending between section line 3-3 and section line 5-5.

As the top part 7 of the lower barrel 4 is connected to the bottom part 6 of the upper barrel 3, the first and second lengths (L1, L2) together equal the overall length (L) of the barrel 2 and the barrel defines the inner space 8 with the interior surface 9 within the first length (L1) of the upper barrel 3 receiving the teat during the milking operation.

Advantageously, during each of the phases A-D of the milking operation, the teat fills up the inner space 8 of the upper barrel 3, at least at one cross-section region of the top part 5 of the upper barrel 3 thereby achieving a seal between the interior surface of the upper barrel 3 of teatcup liner and the teat.

Each embodiment includes a head 10 that defines a mouthpiece 11 through which the teat is inserted during the milking operation. The head 10 defines an upper collar region 12 joined to a head transition portion 13. The head 10 has a head length (Lh) along the longitudinal axis (x). As shown in FIG. 2, the top part 5 of the barrel extends downward from a bottom 14 of the head transition portion 13.

In each embodiment, the head length (Lh) and the first length (L1) of the upper barrel 3 have, in a relaxed state, a combined length along the longitudinal axis (x) such that the head 10 and the upper barrel 3 contain all of the teat during the milking operation and that, during the milking operation, the teat does not extend into the lower barrel 4.

In each embodiment, an outlet portion 15 extends downward from a bottom part 16 of the lower barrel 4 along the longitudinal axis (x). The outlet portion 15 includes an outlet transition portion 17 that connects to the bottom part 16 of the lower barrel 4 (shown at section line 5-5) and includes element 18 that co-operates with the shell of the teat cup by abutting against the shell. The outlet portion 15, at a region where the element 18 abuts the shell, is sufficiently rigid to avoid collapse during all phases A-D of the milking operation.

As shown in FIGS. 3-5, the barrel, in the relaxed state, has transversely to the longitudinal axis (x), a polygonal cross-sectional shape comprised of corner portions 19 and side walls 20, each corner portion 19 connecting two of the side walls 20. Each corner portion 19 and each side wall 20 has a respective exterior surface 21, 22 and an opposite, inner surface 23, 24, with the inner surface 23 of each corner portion 19 being an arcuate first concave curvature open to the inner space.

In the embodiment of FIGS. 2-5, in the liner relaxed state, the upper barrel 3 and the lower barrel 4, transversely to the longitudinal axis (x), have the same polygonal cross-sectional shape comprised of the corner portions 19 and the side walls 20, each corner portion 19 connecting two of said side walls 20, each corner portion 19 and each side wall 20 having the exterior surface 21, 22 and the opposite, inner surface 23, 24, the inner surface 23 of each corner portion 19 being the arcuate first concave curvature open to the inner space 8.

As illustrated in FIGS. 3-5, a preferred embodiment provides the polygonal cross-sectional shape with only three corner portions 19, and only three side walls 20, the invention is not limited to this polygonal shape.

Although the embodiment shown in FIGS. 3-5 illustrates that this preferred embodiment provides the polygonal cross-sectional shape with only three corner portions, and only three side walls, the invention also includes a four sides/four corner portions polygonal shape embodiment.

For the upper barrel 3, each corner portion 19 has a first flexibility for closing such that during a liner collapse phase C of a milking operation the corner portions 19 close to the inner space 8 and the side walls 20 collapse towards the longitudinal axis (x) into the inner space 8 of the upper barrel 3.

For the lower barrel 4, each corner portion 19 has a second flexibility for closing such that during the liner collapse phase C of the milking operation, the corner portions 19 close to the inner space 8 and the side walls 20 collapse towards the longitudinal axis (x) into the inner space 8 of the lower barrel 4.

The closing direction of each corner portion 19 in the upper and lower barrels 3, 4 is schematically shown by arrows A in FIG. 3, whereas the collapse direction of the side walls 20 of the upper and lower barrels 3, 4 is schematically shown by arrows B in FIG. 3.

In all embodiments, the second flexibility is greater than the first flexibility such that the corner portions 19 of the lower barrel 4 are weaker than the corner portions 19 of the upper barrel 3. This assures that, where the barrel is initially in a non-collapsed condition, the lower barrel 4 collapses prior to the upper barrel 3 to create an upward wave movement of the lower barrel 4 towards the upper barrel 3 that securely collapses the upper barrel 3 towards the longitudinal axis (x) into the inner space 8 and onto the teat. This provides an enhanced teat massage and relieves congestion in the teat tissue.

In each embodiment, the second length (L2) of the lower barrel 4 is at least the 30% of the overall length (L) of the barrel 2 to further assure the lower barrel 4 collapses prior to the upper barrel 3 and creates the upward wave movement of the lower barrel 4 towards the upper barrel 3. Preferably, the second length (L2) of the lower barrel 4 is no more than 45% of the overall length (L) of the barrel 2 and more preferably, the second length (L2) of the lower barrel 4 is no more than 40% of the overall length (L) of the barrel 2.

The overall length (L) of the barrel 2, the first length (L1) of the upper barrel 3, and the head length (Lh) are selected based on expected teat length, including the extension of the teat that always occurs during the milking operation, so as to assure that the head 10 and the upper barrel 3 contain all of the teat during the milking operation and that, during the milking operation, the teat does not extend into the lower barrel 4.

Figure 6:
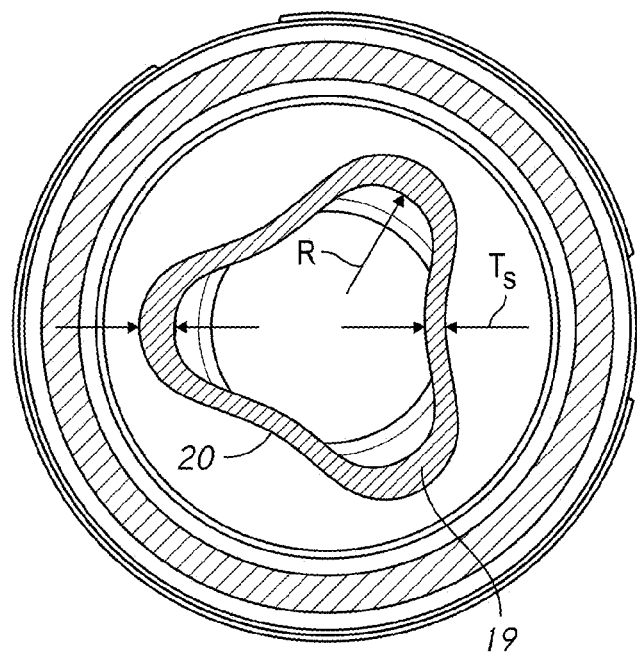
FIGS. 6-7 illustrate polygonal cross-sectional sections of the barrel along section lines 3-3, and 4-4 of FIG. 1 for a very short teat embodiment.
Figure 7:
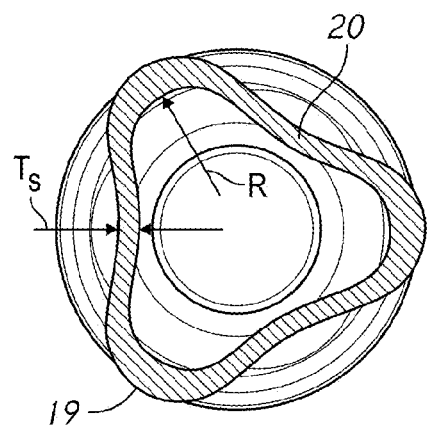

In most embodiments, a combined length of the head length (Lh) and the first length (L1) of the upper barrel 3 is in a range from 60 to 100 mm. In one embodiment suitable for very short teats, the head length (Lh) is 15.5 mm, and the combined length of the head length (Lh) and the first length (L1) of the upper barrel 3 is 85 mm. With reference to FIGS. 6-7, a radius (R) of the center of the corner portions 19 of the upper barrel 3 is 6 mm+/−0.50 mm, more preferably 6 mm+/−0.15 mm and a radius (R) of the center of the corner portions 19 of the lower barrel 4 is 5 mm+/−0.30 mm, more preferably 5 mm+/−0.15 mm.

In the first type embodiments of FIG. 2, a thickness (Ts) of a center part of the side walls 20 along the upper barrel 3 is equal to a thickness (Ts) of a center part of the side walls 20 along the lower barrel 4 from the top part 7 of the lower barrel 4 to the bottom part 16 of the lower barrel 4.

In contrast, a thickness (Tc) of a center part of the corner portions 19 remains constant in the upper barrel 3 down to the bottom part 6 of the upper barrel 3, and then the thickness (Tc) of a center part of the corner portions 19 decreases, from the top part 7 of the lower barrel 4 to the bottom part 16 of the lower barrel 4 with:
  i) a thickness (Tc) of a center part of the corner portions 19 along the bottom part 6 of the upper barrel 3 being equal to the thickness (Tc) of the center part of the corner portions 19 of the top part 7 of the lower barrel 4, and
  ii) the thickness (Tc) of the center part of the corner portions 19 along the bottom part 6 of the upper barrel 3 being greater than the thickness (Tc) of the center part of the corner portions 19 along the bottom part 16 of the lower barrel 4 by at least 25%.

In such embodiments, the thickness (Ts) of the center part of the side walls 20 along the upper barrel 3 and the lower barrel 4 may be 1.75 mm+/−0.20 mm, while the thickness (Tc) of the center part of the corner portions 19 along the upper barrel may be 3 mm+/−0.15 mm.

More preferably, the thickness (Tc) of the center part of the corner portions 19 along the bottom part 6 of the upper barrel 3 is greater than the thickness (Tc) of the center part of the corner portions 19 along the bottom part 16 of the lower barrel 4 by at least 30% and no more than 75%.

In preferred embodiments the thickness (Tc) of the center part of the corner portions 19 along the of the top part 7 of the lower barrel 4 may be 3 mm, whereas the thickness (Tc) of the center part of the corner portions 19 along the bottom part 16 of the lower barrel 4 may be a range from 1.74 mm through 2.3 mm.

In some of these preferred embodiments, the thickness of the center part (Tc) of the corner portions 19 along the bottom part 6 of the upper barrel 3 is greater than the thickness (Tc) of the center part of the corner portions 19 along the bottom part 16 of the lower barrel 4 by at least 60%.

In some particular embodiments, at the top part 5 of the upper barrel 3, a radius of the corner portions 19 may be 5.85 mm+/−0.30 mm, more preferably 5.85 mm+/−0.15 mm, the thickness (Ts) of the center part of the side walls along the upper barrel 3 and the lower barrel 4 may be 1.80 mm+/−0.20 mm, more preferably 1.8 mm+/−0.15 mm, the thickness (Tc) of the center part of the corner portions 19 along the lower barrel 4 may be no more than 2.3 mm+/−0.20 mm., more preferably 2.3 mm+/−0.15 mm. At the bottom part 16 of the lower barrel 4, the radius of the corner portions 19 may be 4.65 mm+/−0.30 mm., more preferably 4.65 mm+/−0.15 mm.

In other particular embodiments, at the top part 5 of the upper barrel 3, a radius of the corner portions 19 may be 5.85 mm+/−0.30 mm., more preferably 5.85 mm+/−0.15 mm; however, the thickness (Ts) of the center part of the side walls 20 along the upper barrel 3 and the lower barrel 4 may be 1.7 mm+/−0.25 mm, the thickness (Tc) of the center part of the corner portions 19 along the lower barrel 4 may be no more than 1.74 mm+/−0.25 mm, and at the bottom part 16 of the lower barrel 4, the radius of the corner portions 19 varies along the inner surface 23 with a smallest radius being 2.49 mm+/−0.20 mm., more preferably 2.49 mm+/−0.15 mm at the center of the inner surface 23.

Figure 8:
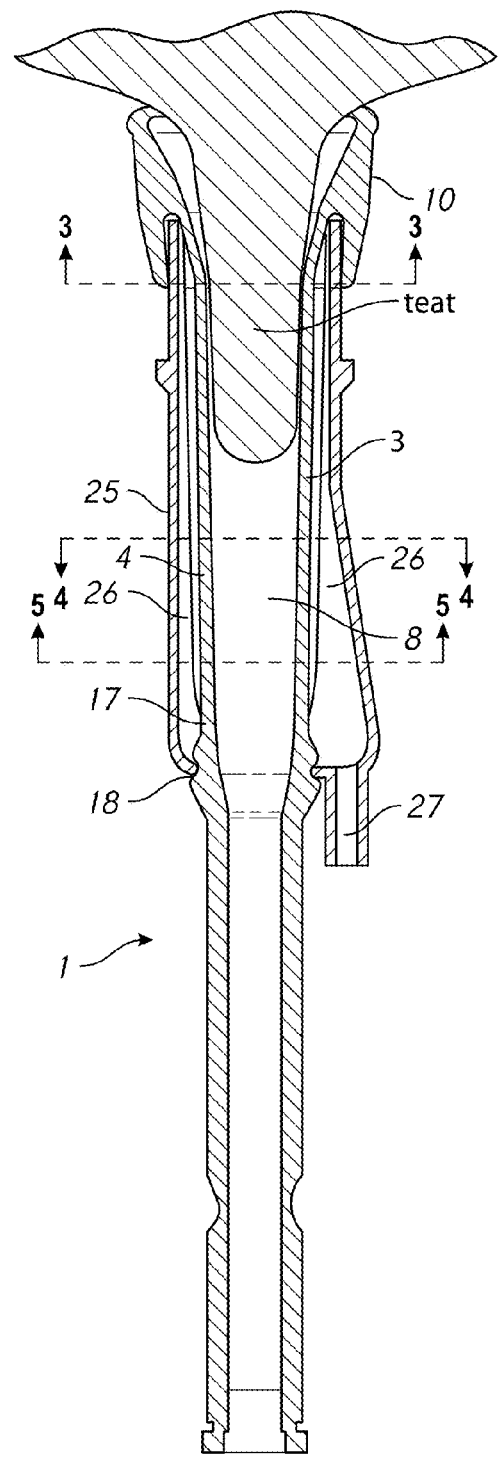
FIG. 8 illustrates the teatcup liner mounted in a shell in a longitudinal sectional view.

FIG. 8 illustrates the teatcup liner 1 mounted in a shell 25 in a longitudinal sectional view. Element 18 of the outlet transition portion 17 is shown co-operating with the shell 25 by having the teatcup liner 1 abut against the shell 25. Additionally, the outlet portion 15, at the region where the element 18 abuts the shell, is sufficiently rigid to avoid collapse during all phases A-D of the milking operation.

With the teatcup liner 1 mounted in the shell 25, the shell 25 defines a pulsation space 26 between an interior of the shell and an exterior of the teatcup liner 1. The shell 25 has a vacuum line connection 27. As shown, the teatcup liner 1 is mounted in the shell 25 with the head 10 bearing against the top of the shell 25, and element 18 of the outlet portion 15 co-operating with the shell 25 by abutting against a lower part of the shell 25.

The barrel 2 is tapered along the overall length (L) from the head 10 to the outlet portion 15. In this embodiment, neither the head 10 nor the barrel 2 have a vent (air inlet).

Figure 9:
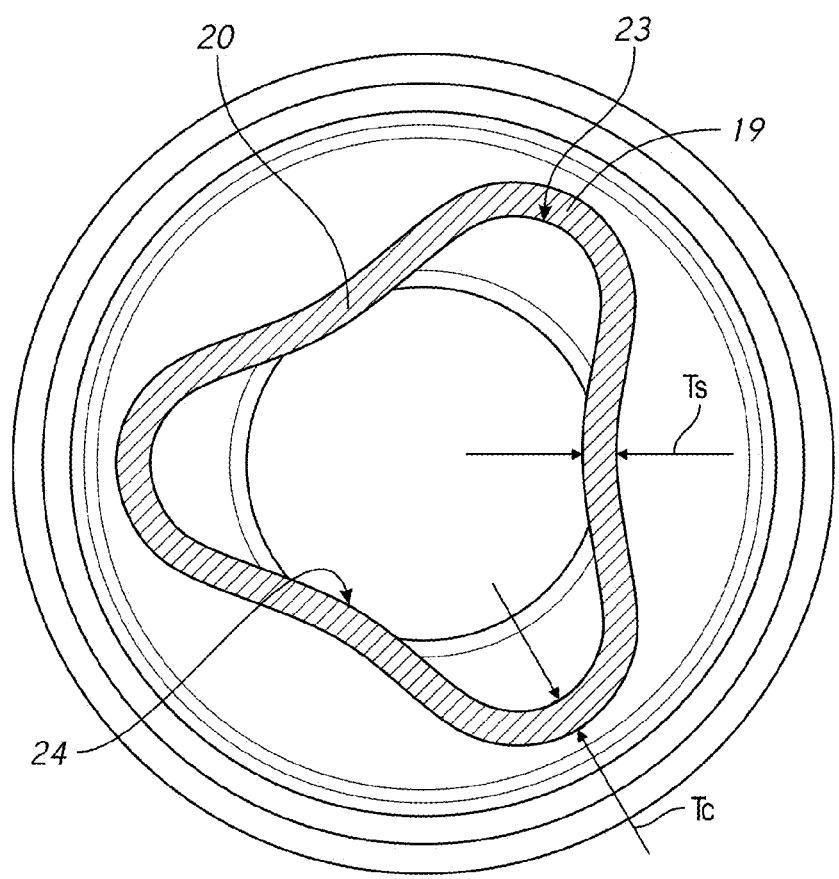
FIGS. 9-11 illustrate polygonal cross-sectional sections of the barrel along section lines 3-3, 4-4, and 5-5 of FIG. 8, in an embodiment having notches.
Figure 11:
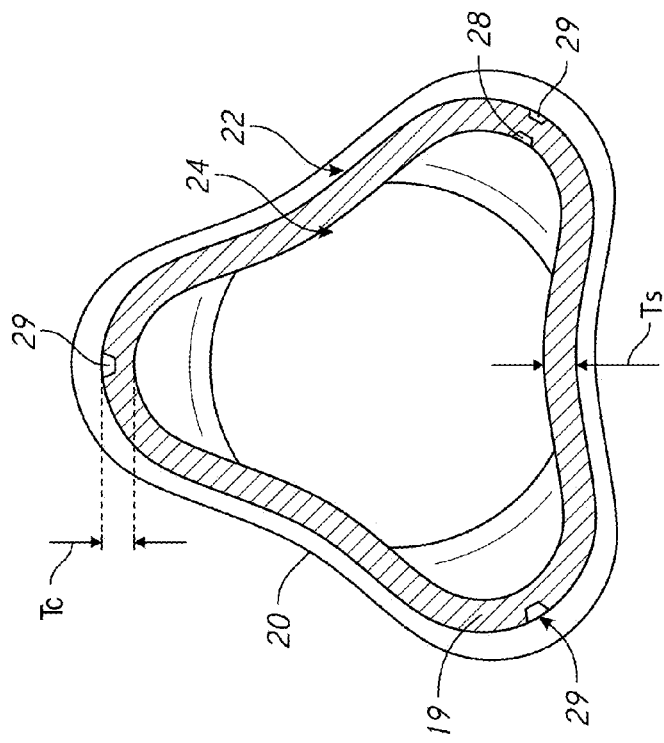
Figure 10:
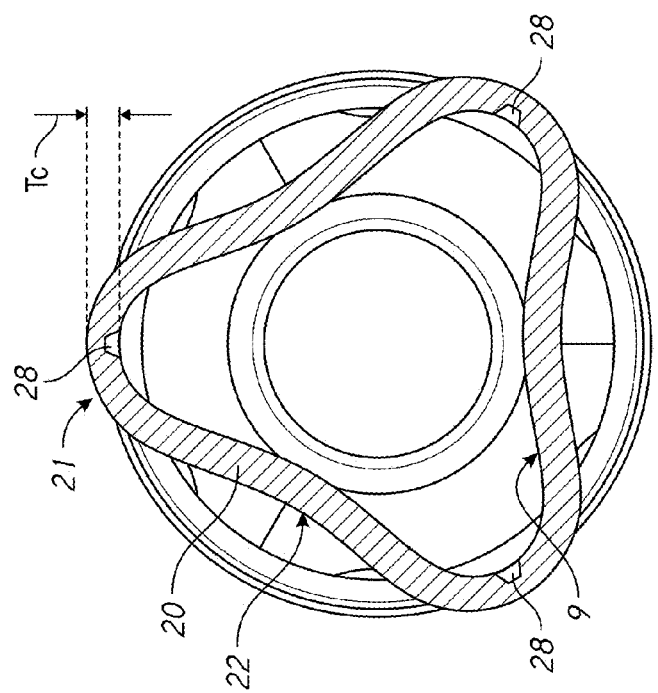

FIG. 8 also represents a longitudinal cross-sectional side view of a second type embodiment of a teatcup liner according to the invention. FIGS. 9-11 illustrate polygonal cross-sectional sections of the barrel along section lines 3-3, 4-4, and 5-5 of FIG. 8. In general, the elements and features of the second type embodiments are the same as in the first type embodiment with differences discussed below.

In the second type embodiments, each corner portion 19 of the upper barrel 3 has the first flexibility for closing such that during a liner collapse phase C of a milking operation, the corner portions 19 close to the inner space 8 and the side walls 20 collapse towards the longitudinal axis (x) into the inner space 8 of the upper barrel 3.

However, in the lower barrel 4 there are provided notches 28, 29 such that the notches 28, 29 result in each corner portion 19 of the lower barrel 4 having the second flexibility for closing such that during the liner collapse phase C of the milking operation the corner portions 19 of the lower barrel 4 close to the inner space 8 of the lower portion 4, and the side walls 20 collapse towards the longitudinal axis (x) into the inner space 8 of the lower barrel 4. Again, as in the first type embodiments, the second flexibility is greater than the first flexibility such that the corner portions 19 of the lower barrel 4 are weaker than the corner portions 19 of the upper barrel 3, thereby assuring the lower barrel 4 collapses prior to the upper barrel 3 to create the upward wave movement of the lower barrel 4 towards the upper barrel 3 that securely collapses the upper barrel 3 onto the teat. The notches may be, e.g., V-shaped notches or U-shaped notches with squared or rounded inside corners In the second type embodiments, at least two of the corner portions 19 of the lower barrel 4 comprise a notch 28, 29 running along a longitudinal direction of the lower barrel 4 on at least one of the exterior surface 21 and the inner surface 23 of the two corner portions 19 of the lower barrel 4, each notch 28, 29 providing a hinge to the corresponding corner portions 19.

In all the second type embodiments, all of the corner portions of the upper barrel are free of any notch running along the longitudinal direction on both the exterior surface 21 and the inner surface 23 of the corner portions 19 of the upper barrel 3.

In second type embodiments, the notch of each of the two corner portions 19 of the lower barrel 4 is an interior notch 28 that runs along the longitudinal direction on the inner surface 23 of the two corner portions 19 of the lower barrel 4.

In other some second type embodiments, the notch of each of the two of the corner portions 19 of the lower barrel 4 is an exterior notch 29 that runs along the longitudinal direction on the exterior surface 21 of the two corner portions 19 of the lower barrel 4.

In the second type embodiments having the notches 28, 29, each of the side walls 20 and the corner portions 19 of the upper barrel 3 and of the lower barrel 4 have a same thickness transverse to the longitudinal axis (x), except at the notches 28, 29. That is, Tc=Ts in the lower barrel 4 of the second embodiment.

In preferred embodiments of the second type, each of the corner portions 19 of the lower barrel 4 comprise the notch 28, 29, the notch being located at a center part of each corner portion 19 of the lower barrel 4 and extending 30% to 60% into a thickness of the center part of each corner portion 19 of the lower barrel 4.

In some preferred "double notch" embodiments, each corner portion 19 of the lower barrel 4 comprise first and second notches (28, 29) located at the center part of each corner portion 19 of the lower barrel 4 and running along a longitudinal direction of the lower barrel 4, the first notch being an interior notch 28 on the interior surface 23 and the second notch being an exterior notch 29 on the exterior surface 21 of the corner portions 19 of the lower barrel 4, each notch 28, 29 providing a hinge to the corresponding corner portions 19.

In these "double notch" embodiments, each notch 28, 29 extends 15-30% into a thickness of the center part of each corner portion 19 of the lower barrel 4. As with all the second type embodiments, all of the corner portions are free of any notch running along the longitudinal direction of the upper barrel on both of the exterior surface and the inner surface of the corner portions at the center part of the corner portions of the upper barrel.

As with the first type embodiments, the second length (L2) of the lower barrel 4 is at least the 30% of the overall length (L) of the barrel 2; preferably the second length (L2) of the lower barrel is no more than 45% of the overall length of the barrel (L); and more preferably the second length (L2) of the lower barrel is no more than 40% of the overall length of the barrel (L).

In the above-discussed embodiments, the teatcup liner may be a modular liner where the head 10, the barrel 2, and the outlet portion 15 are each modules that connect to each other, either directly or indirectly, e.g., the barrel 2 connects to the head 10 at section line 3-3 and to the outlet portion 15 at section line 5. For the interpretation of the claims, the term "relaxed state" refers to the state when the teatcup liner is not mounted in the shell of the teatcup and thus not subjected to any external forces at all. However, "relaxed state" may also refer to the state when the teatcup liner is mounted in the shell of the teatcup, and not subjected to any further external forces other than from the tensioning resulting from the mounting of the teatcup liner in the shell of the teatcup. In any case, the teatcup liner is not subjected to, for instance, a milking vacuum or a pulsating vacuum in the "relaxed state", or to the forces or pressures arising when the teat is introduced into the inner space of the teatcup liner.

The invention claimed is:

1. A teatcup liner (1) configured to be mounted in a shell of a teatcup and to be applied to a teat of an animal, with a pulsation chamber between the liner and an inner side of the shell being connected to vacuum and atmospheric pressure, or a sub-pressure less than the milking vacuum, in a cyclic manner during a milking operation, the liner having a longitudinal shape extending along a longitudinal axis (x), the teatcup liner comprising:

a barrel (2) having a top (5) that extends downward, wherein the barrel is comprised of i) an upper barrel (3) of a first length (L1), and ii) a lower barrel (4) of a second length (L2), where the first and second lengths (L1, L2) together equal the overall length (L) of the barrel, and a top part (7) of the lower barrel is connected to a bottom part (6) of the upper barrel (3), the barrel defines an inner space (8) with an interior surface (9) within the upper barrel (3) for receiving the teat, wherein the barrel, in the relaxed state, has transversely to the longitudinal axis (x), a polygonal cross-sectional shape comprised of corner portions (19) and side walls (20), each corner portion connecting two of said side walls, each corner portion and each side wall having an exterior surface and an opposite, inner surface, the inner surface of each corner portion being an arcuate first concave curvature open to the inner space, wherein, for the upper barrel, each corner portion has a first flexibility for closing such that during a liner collapse phase of a milking operation the corner portions close to the inner space and the side walls collapse towards the longitudinal axis (x) into the inner space of the upper barrel, wherein, for the lower barrel, each corner portion has a second flexibility for closing such that during the liner collapse phase of the milking operation the corner portions close to the inner space and the side walls collapse towards the longitudinal axis (x) into the inner space of the lower barrel, the second flexibility being greater than the first flexibility such that the corner portions of the lower barrel are weaker than the corner portions of the upper barrel, thereby assuring the lower barrel collapses prior to the upper barrel, wherein, a thickness of a center part of the side walls along the upper barrel is equal to a thickness of a center part of the side walls along the lower barrel from the top part of the lower barrel to the bottom part of the lower barrel, and wherein, a thickness of a center part of the corner portions remains constant in the upper barrel down to the bottom part of the upper barrel, and then the thickness of a center part of the corner portions decreases, from the top part of the lower barrel to the bottom part of the lower barrel with:

i) a thickness of a center part of the corner portions along the bottom part of the upper barrel being equal to the thickness of the center part of the corner portions of the top part of the lower barrel, and ii) the thickness of the center part of the corner portions along the bottom part of the upper barrel being greater than the thickness of the center part of the corner portions along the bottom part of the lower barrel by at least 25%.

2. The teatcup liner of claim 1, further comprising:

a head (10) defining a mouthpiece (11) through which the teat is inserted during the milking operation, the head defining an upper collar region (12) joined to a head transition portion (13) and having a head length (Lh) along the longitudinal axis (x), wherein the barrel (2) is connected to the head (10) and the top (5) of the barrel (2) extends downward from a bottom of the head transition portion, wherein the head length (Lh) and the first length of the upper barrel have, in the relaxed state, a combined length along the longitudinal axis (x) such that the head and the upper barrel contain all of the teat during the milking operation and that, during the milking operation, the teat does not extend into the lower barrel; and an outlet portion (15) connected to and extending downward from a bottom part (16) of the lower barrel along the longitudinal axis (x), the outlet portion (15) including an outlet transition portion (17) that connects to the bottom part (16) of the lower barrel (4) and includes an element (18) that co-operate with the shell of the teat cup.

3. The teatcup liner of claim 1, wherein the thickness of the center part of the corner portions along the bottom part of the upper barrel being greater than the thickness of the center part of the corner portions along the bottom part of the lower barrel by at least 60%.

4. The teatcup liner of claim 1, wherein, the thickness of the center part of the side walls along the upper barrel and the lower barrel is 1.75 mm+/−0.20 mm, and the thickness of the center part of the corner portions along the upper barrel is 3 mm+/−0.15 mm.

5. The teatcup liner of claim 4, wherein, at the top of the upper barrel, a radius of the corner portions is 5.85 mm+/−0.30 mm, the thickness of the center part of the side walls along the upper barrel and the lower barrel is 1.8 mm+/−0.15 mm, the thickness of the center part of the corner portions along the lower barrel is no more than 2.3 mm+/−0.15 mm, and at the bottom part of the lower barrel, the radius of the corner portions is 4.65 mm+/−0.30 mm.

6. The teatcup liner of claim 3, wherein, at the top of the upper barrel, a radius of the corner portions is 5.85 mm+/−0.30 mm, the thickness of the center part of the side walls along the upper barrel and the lower barrel is 1.7 mm+/−0.25 mm, the thickness of the center part of the corner portions along the lower barrel is no more than 1.74 mm+/−0.25 mm, and at the bottom part of the lower barrel, the radius of the corner portions varies with a smallest radius of 2.49 mm+/0.20 mm at center of the inner surface.

7. The teatcup liner according to claim 1, wherein, the polygonal cross-sectional shape defines only three corner portions, and only three side walls.

8. The teatcup liner of claim 2 in combination with the teatcup, wherein, the teatcup comprising a shell that defines a pulsation space between an interior of the shell and an exterior of the teatcup liner, the shell having a vacuum line connection, the teatcup liner is mounted in the shell with the shell bearing against the head and the outlet portion, the barrel is tapered along the overall length (L) from the head to the outlet portion, and the head and the barrel are each vent-free.

9. The teatcup liner according to claim 1, wherein, when located within the polygonal cross-sectional shape of the upper barrel, the teat fills up the inner space during all pulsation phases (a, b, c, d) during the milking operation with the interior surface (25) sealed against the teat.

10. The teatcup liner of claim 1, wherein, in the liner relaxed state, the upper barrel and the lower barrel, transversely to the longitudinal axis (x), have the same polygonal cross-sectional shape comprised of the corner portions and the side walls, each corner portion connecting two of said side walls, each corner portion and each side wall having an exterior surface and the opposite, inner surface, the inner surface of each corner portion being the arcuate first concave curvature open to the inner space.

11. The teatcup liner of claim 2, wherein a combined length of the head length (Lh) and the first length of the upper barrel, in the relaxed state, is in a range from 60 to 100 mm.

12. The teatcup liner of claim 11, wherein, the second length (L2) of the lower barrel is at least the 30% of the overall length of the barrel (L).

13. The teatcup liner of claim 1, wherein, the second length (L2) of the lower barrel is at least the 30% of the overall length of the barrel (L).

14. The teatcup liner of claim 13, wherein, the second length (L2) of the lower barrel is no more than 45% of the overall length of the barrel (L).

15. The teatcup liner of claim 13, wherein, the second length (L2) of the lower barrel is no more than 40% of the overall length of the barrel (L).

16. A teatcup liner (1) configured to be mounted in a shell of a teatcup and to be applied to a teat of an animal, with a pulsation chamber between the liner and an inner side of the shell being connected to vacuum and atmospheric pressure, or a sub-pressure less than the milking vacuum, in a cyclic manner during a milking operation, the liner having a longitudinal shape extending along a longitudinal axis (x), the teatcup liner comprising:

a barrel (2) having a top (5) that extends downward,
wherein the barrel is comprised of i) an upper barrel (3) of a first length (L1), and ii) a lower barrel (4) of a second length (L2), where the first and second lengths (L1, L2) together equal the overall length (L) of the barrel, and a top part (7) of the lower barrel is connected to a bottom part (6) of the upper barrel (3), the barrel defines an inner space (8) with an interior surface (9) within the upper barrel (3) for receiving the teat,
wherein the barrel, in the relaxed state, has transversely to the longitudinal axis (x), a polygonal cross-sectional shape comprised of corner portions (19) and side walls (20), each corner portion connecting two of said side walls, each corner portion and each side wall having an exterior surface and an opposite, inner surface, the inner surface of each corner portion being an arcuate first concave curvature open to the inner space,
wherein, for the upper barrel, each corner portion has a first flexibility for closing such that during a liner collapse phase of a milking operation the corner portions close to the inner space and the side walls collapse towards the longitudinal axis (x) into the inner space of the upper barrel,
wherein, for the lower barrel, each corner portion has a second flexibility for closing such that during the liner collapse phase of the milking operation the corner portions close to the inner space and the side walls collapse towards the longitudinal axis (x) into the inner space of the lower barrel, the second flexibility being greater than the first flexibility such that the corner portions of the lower barrel are weaker than the corner portions of the upper barrel, thereby assuring the lower barrel collapses prior to the upper barrel, wherein,
at least two of the corner portions of the lower barrel comprise a notch running along a longitudinal direction of the lower barrel on at least one of the exterior surface and the inner surface of the two corner portions of the lower barrel, each notch providing a hinge to the corresponding corner portions, and
all of the corner portions of the upper barrel are free of any notch running along the longitudinal direction on both the exterior surface and the inner surface of the corner portions of the upper barrel.

17. The teatcup liner of claim 16, wherein, the notch of each of the at least two of the corner portions of the lower barrel is i) an exterior notch (29) running on the exterior surface of the two corner portions of the lower barrel, or ii) an interior notch (28) running on the inner surface of the two corner portions of the lower barrel.

18. The teatcup liner of claim 17, wherein each of the side walls and the corner portions of the upper and lower barrels have a same thickness transverse to the longitudinal axis (x), except at the notches.

19. The teatcup liner of claim 16, wherein, each of the corner portions of the lower barrel comprise the notch, the notch being located at a center part of each corner portion of the lower barrel and extending 30% to 60% into a thickness of the center part of each corner portion of the lower barrel.

20. A teatcup liner (1) configured to be mounted in a shell of a teatcup and to be applied to a teat of an animal, with a pulsation chamber between the liner and an inner side of the shell being connected to vacuum and atmospheric pressure, or a sub-pressure less than the milking vacuum, in a cyclic manner during a milking operation, the liner having a longitudinal shape extending along a longitudinal axis (x), the teatcup liner comprising:

a barrel (2) having a top (5) that extends downward,
wherein the barrel is comprised of i) an upper barrel (3) of a first length (L1), and ii) a lower barrel (4) of a second length (L2), where the first and second lengths (L1, L2) together equal the overall length (L) of the barrel, and a top part (7) of the lower barrel is connected to a bottom part (6) of the upper barrel (3), the barrel defines an inner space (8) with an interior surface (9) within the upper barrel (3) for receiving the teat,
wherein the barrel, in the relaxed state, has transversely to the longitudinal axis (x), a polygonal cross-sectional shape comprised of corner portions (19) and side walls (20), each corner portion connecting two of said side walls, each corner portion and each side wall having an exterior surface and an opposite, inner surface, the inner surface of each corner portion being an arcuate first concave curvature open to the inner space,
wherein, for the upper barrel, each corner portion has a first flexibility for closing such that during a liner collapse phase of a milking operation the corner portions close to the inner space and the side walls collapse towards the longitudinal axis (x) into the inner space of the upper barrel,
wherein, for the lower barrel, each corner portion has a second flexibility for closing such that during the liner collapse phase of the milking operation the corner portions close to the inner space and the side walls collapse towards the longitudinal axis (x) into the inner space of the lower barrel, the second flexibility being greater than the first flexibility such that the corner portions of the lower barrel are weaker than the corner portions of the upper barrel, thereby assuring the lower barrel collapses prior to the upper barrel, wherein, each corner portion of the lower barrel comprise first and second notches located at a center part of each corner portion of the lower barrel and running along a longitudinal direction of the lower barrel, the first notch on the exterior surface and the second notch on the inner surface of the corner portions of the lower barrel, each notch providing a hinge to the corresponding second corner portions, each notch extends 15-30% into a thickness of the center part of each corner portion of the lower barrel, and all of the corner portions are free of any notch running along the longitudinal direction of the upper barrel on both of the exterior surface and the inner surface of the corner portions at a center part of the corner portions of the upper barrel.

* * * * *